Aug. 29, 1933.            A. W. TRONNIER            1,924,527
UNSYMMETRICAL OBJECTIVE LENS SYSTEM
Filed July 3, 1930
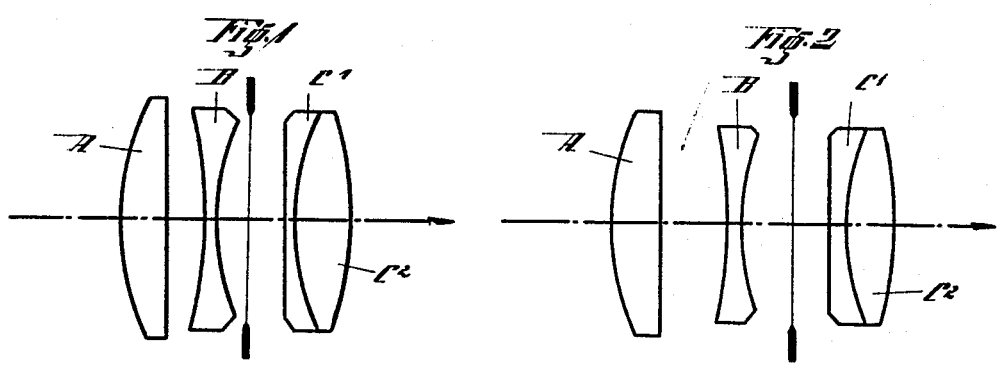
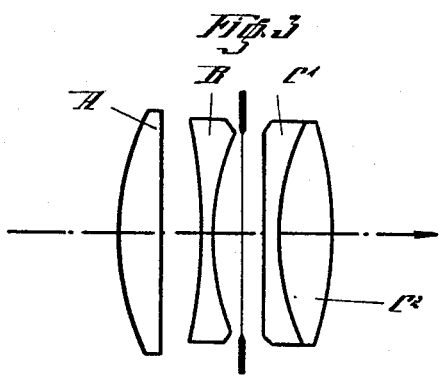
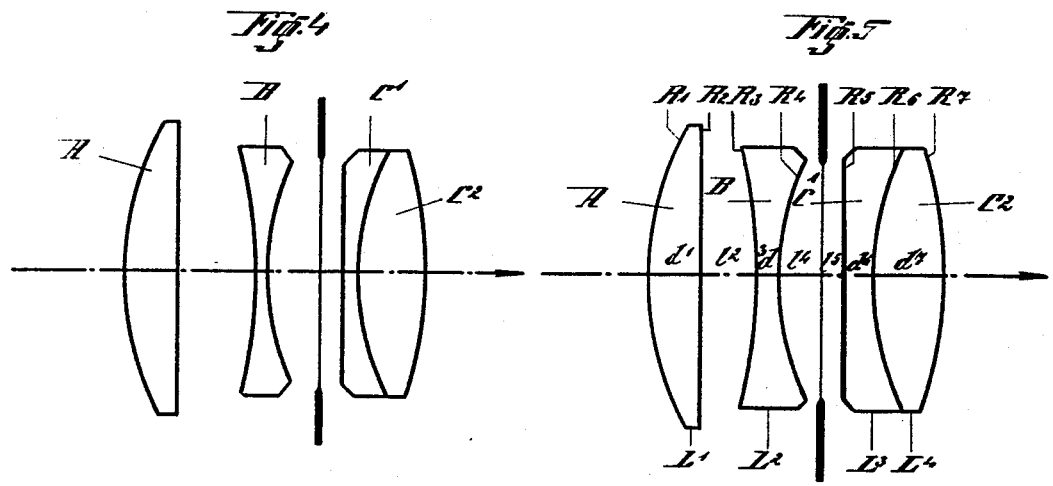
Inventor:
A. W. Tronnier
by:
Hans Hederich
Attorney

UNITED STATES PATENT OFFICE 1,924,527

UNSYMMETRICAL OBJECTIVE LENS SYSTEM

Albrecht Wilhelm Tronnier, Kreuznach, Germany

Application July 3, 1930, Serial No. 465,576, and in Germany August 1, 1929

5 Claims. (Cl. 88—57)

This invention relates to an unsymmetrical objective lens system having six surfaces in contact with the air. There exist objective lens systems of this type, in which the system of lenses comprises two individual lenses separated from one another by an air space, and a compound lens airspaced from the second of said individual lenses, the rays of light passing first through these latter lenses and then through said compound lens. The refractive power $\left(\frac{1}{f}\right)$ of the one of the individual lenses is opposite to that of the other of the same the two outer surfaces of the compound lens have different curvatures, and the refractive power of the said compound lens is stronger than the refractive power of the complete objective lens system. There are among the known objective lens systems of the just stated kind also such in which one of the individual lenses is a collective lens, the other a dispersive lens and in which this lens is arranged between the collective lens and the compound lens and is designed as a dispersing concavo-convex lens, or a negative meniscus lens respectively; and there exists also a system in which the dispersing individual lens is designed as a biconcave lens.

The present invention relates to this last-mentioned constructional form of the unsymmetrical objective lens systems comprisng four lenses having six surfaces in contact with the air. This constructional form is distinguished by its relatively good general properties, and the most important representatives thereof correspond to the following successions of glass, viz:

$$n_H-n_H-n_N+n_H$$
$$n_H-n_M-n_N+n_H$$
$$n_H-n_N-n_N+n_H$$
$$n_M-n_H-n_N+n_H$$
$$n_M-n_N-n_N+n_M$$
$$n_M-n_M-n_N+n_H$$
$$n_N-n_M-n_N+n_H$$
$$n_N-n_M-n_N+n_M$$

N means low, M means middle, and H means high. Low, that is a position of the refractive index of the glasses used below 1.56—with reference to the yellow ray—, middle, that is a position of said index of from 1.56 to 1.60, and high, that is a position of said index of above 1.60. The air spaces are indicated in said expressions by simple short connecting dashes (—), and the cemented surfaces of the compound lenses are indicated by crosses (+).

These lens arrangements are particularly suitable for bringing about a good spherical correction also for larger relative openings at an anastigmatic flattened field over a comparatively large angle, within which in general the aberrations of the sagittal and meridional rays from the ideal focal plane can be kept below about 1% of the equivalent focal length. With a view to an easy and economical manufacture of lens arrangements of this kind it has been found possible to fulfill, with some of them, the presuppositions requisite therefore, viz. that the radius of curvature of the cemented surface of the compound lens is larger than 80% of the effective diameter of the (aperture-) opening of the objective, and that, besides, the sum of the absolute lengths of the radii of curvature of those two faces of the individual lenses which are directed towards the incident rays of the light, together with the absolute length of the radius of curvature of that face of the compound lens which is directed towards the picture end of the objective, is greater than 80% of the equivalent focal length of the objective.

It has repeatedly been tried to further develop the last-mentioned constructional form of the objective lens system with its four lenses, of which one is a compound lens and which have six surfaces in contact with the air, by the introduction of glasses with low refraction for the collecting front lens but with keeping up the use of a heavier sort of glass for the then following dispersing lens, and reversely, by the introduction of glasses with low refraction for the dispersing lens behind the front lens, and keeping up the employment of a heavier sort of glass, especially the heaviest barium crown glass, for the collective lens. In the first of these cases there arise always very strong surface curvatures in connection with a partly extraordinarily large omittance of the spherical aberration and the remainders of the zones thereof also for larger opening relations, whereas in the opposite case comparatively flat radii of curvature are obtained, it is true, but only a relatively moderate opening at comparatively very great aberrations, especially of the oblique rays, and very great length of the system, could be attained.

Now, as regards the present invention, the effect sought to be attained, and being attained, is this to keep up the advantages present by the known objective lens systems comprising four lenses having six surfaces in contact with the air, but to obviate the disadvantages of those systems, to attain at the same time a partly particularly good correction of the aberrations, and to make use of several glasses of low refraction. The characteristic features of the invention reside, thus, in the particular selection or choice of the constructive basis, especially as regards the sorts of glass used, viz. in such a manner that, firstly the refractive index of the individual inner dispersing lens—with reference to the yellow ray—is smaller than 1.56, and that secondly the difference between the refractive indices of the two exterior collecting lenses is larger than 25% of the difference between the exponents of refraction at the cemented surface of the compound lens, and that, thirdly, at the same time the difference between the refractive indices of the glasses of the individual negative lens and of the adjacent component of the compound lens is smaller than the difference between the indices at the cemented surface of the compound lens, and that, (or that, in lieu of what has been stated under thirdly), fourthly, the difference between the refractive indices of the two individual lenses enclosing the front air space is smaller than 75% of the difference between the indices at the cemented surface of the compound lens.

When the above-stated conditions are observed, it is possible to obtain lens arrangements with particularly good properties, especially if the thicknesses of the components of the objective lens system and the distance between these components are so distributed that the ratio between the sum of all glass thicknesses to the sum of the two air spaces, as well as the ratio between these air spaces lies between the values 0.4 and 2.5.

The invention is illustrated diagrammatically and by way of example on the accompanying drawing on which Figure 1 is a side-view of an objective lens system designed according to this invention, and Figures 2, 3, 4 and 5 are similar views showing modifications. All these examples are designed for an equivalent focal length of 200 mm., and the detonations used hereinafter correspond to those of the numerical examples, which relate to the unity. The distance of the Gaussian focal plane from the rear vertex of the lens is denoted $p'$.

In all these figures, D denotes the direction in which the rays of light pass through the consecutive lenses; A denotes the front lens which is a collecting lens; $C^1$ $C^2$ are the components constituting the compound lens; and B is the negative lens located between the lenses A and $C^1$ $C^2$. Besides, $R^1$ denotes the convex surface of the lens A; and $R^2$ denotes the plane surface of the same; $R^3$ and $R^4$ denote the two concave surfaces of the lens B; $R^5$ denotes the inner surface of the compound lens component $C^1$, $R^7$ denotes the convex surface of the compound lens $C^2$, and $R^6$ denotes the cemented surfaces of these components. Furthermore, $d^1$, $d^3$, $d^6$ and $d^7$ denote the thicknesses or axial lengths of the several lenses, and $1^2$ and $1^4$, $1^5$ denote the air spaces between them.

Concerning now Fig. 1, the refractive index of the lens A is smaller than the index of the lens B. The utilizable opening of the objective is about =0.222.

Relative opening 1:4.5 $p'=0.91075$.
$R1=+0.25061$
    $d^1=0.049031$  L1=1.5240  $v1=59.3$
$R2=\infty$
    $1^2=0.035091$ air
$R3=-0.61337$
    $d3=0.010674$  L2=1.5410  $v2=46.8$
$R4=+0.23606$
    $1^4=0.032424$ | air
    $1^5=0.032424$ |
$R5=-3.00513$
    $d6=0.010674$  L3=1.5310  $v3=48.3$
$R6=+0.23606$
    $d7=0.053776$  L4=1.6140  $v4=60.0$
$R7=-0.38355$ The refractive indices stated relate to the yellow ray, and the relative dispersion is denoted by $v$ and is generally expressed by the formula $$v=\frac{n_D-1}{n_F-n_C}.$$

In the modification Fig. 2 the refractive index of the lens A is only a little smaller than that of the lens B. The aberrations are done away with for a smaller field of vision, and all aberrations and the zones thereof are reduced in a high degree.

Relative opening 1: 4.8 $p'=0.85398$
$R1=+0.26816$
    $d^1=0.49809$  L1=1.5410  $v1=60.0$
$R2=\infty$
    $1^2=0.067017$ air
$R3=0.53631$
    $d3=0.015849$  L2=1.5495  $v2=45.1$
$R4=+0.23936$
    $1^4=0.047999$ | air
    $1^5=0.038035$ |
$R5=\infty$
    $d6=0.015849$  L3=1.5310  $v3=48.3$
$R6=+0.23936$
    $d7=0.040753$  L4=1.6140  $v4=60.0$
$R7=-0.39847$ In Fig. 3 the refractive indices of the two lenses A and B are equal for the yellow ray. The objective is well corrected for a field of 60 degrees; the aperture=0.222.

Relative openings 1: 4.5 $p'=0.89524$.
$R1=+0.23739$.
    $d^1=0.046444$  L1=1.5410  $v1=60.9$
$R2=\infty$
    $1^2=0.033239$ air
$R3=-0.58100$
    $d3=0.010113$  L2=1.5410  $v2=46.8$
$R4=+0.22361$
    $1^4=0.030713$ | air
    $1^5=0.023222$ |
$R5=-1.92441$
    $d6=0.010113$  L3=1.5220  $v3=50.8$
$R6=+0.22361$
    $d7=0.050939$  L4=1.6140  $v4=60.0$
$R7=-0.38204$ Concerning Fig. 4 the refractive indices of the lenses A and B correspond to those of Fig. 3. The utilizable amounts to about 54° at a largest opening of 0.263.

Relative opening 1: 3.8 $p'=0.84128$.
$R1=+0.28027$
    $d^1=0.052060$  L1=1.5410  $v1=60.9$
$R2=\infty$
    $1^2=0.070043$ air
$R3=-0.56054$
    $d3=0.016565$  L2=1.5410  $v2=46.8$
$R4=+0.25017$
    $1^4=0.050168$ | air
    $1^5=0.020822$ |
$R5=\infty$
    $d6=0.016565$  L3=1.5225  $v3=51.5$
$R6=+0.25585$
    $d7=0.062471$  L4=1.6130  $v4=59.5$
$R7=-0.41273$ As regards, finally, Fig. 5, the refractive index of the lens A is greater than that of the lens B. The largest utilizable opening amounts to about 0.280.

Relative opening 1:3.6  $p'=0.85642$.

$R1=+0.29869$
  $d1=0.050404$  $L1=1.5795$  $v1=59.2$
$R2=\infty$
  $l2=0.050404$  air
$R3=-0.66367$
  $d3=0.028003$  $L2=1.5485$  $v2=45.3$
$R4=+0.26976$
  $l4=0.041071$ } air
  $l5=0.021468$
$R5=\infty$
  $d6=0.028003$  $L3=1.5220$  $v3=50.8$
$R6=+0.26976$
  $d7=0.062537$  $L4=1.6140$  $v4=60.0$
$R7=-0.46671$

I claim:

1. An unsymmetrical object lens system, comprising, in combination, and enumerated with respect to the direction of the rays of light, a plano-convex lens (A), a biconcave lens (B) separated from said plano-convex lens by a dispersing air-space ($l^2$), and a compound lens ($C^1$ $C^2$) separated from said biconcave lens by an air-space ($l^4$ $l^5$) and comprising a concave lens ($C^1$) and a biconvex lens ($C^2$), in which lens system, firstly, the first two lenses (A and B) are so designed that they exert together a dispersing effect of such a strength that their collecting effect, if any, is practically zero; secondly, the reciprocal value of the focal distance of the second lens (B) is the opposite of that of the first lens (A) and its exponent of refraction—with reference to the yellow ray—is smaller than 1.56; thirdly, the compound lens members ($C^1$ $C^2$) have outer surfaces with different curvatures and the radius of curvature of their united surfaces ($R^5$ $R^7$) is longer than 80% of the effective opening diameter of the objective and these members are so designed as to have together a strongly collecting effect; fourthly, the sum of the absolute lengths of the radii of curvature of those surfaces ($R^1$ $R^3$) of the first two lenses (A and B) which are directed towards the object, together with the absolute length of that surface ($R^7$) of the compound lens ($C^1$ $C^2$) which is directed towards the image is greater than 80% of the total focal length of the objective; fifthly, the difference between the refraction numbers of the first lens (A) and of the last lens ($C^2$) is greater than 25% of the difference between the exponents of refraction of the united outer surfaces ($R^5$ $R^7$) of the compound lens members ($C^1$ $C^2$); and sixthly, the difference between the exponents of refraction of the second lens (B) and of the adjacent member ($C^1$) of the compound lens is smaller than the difference between the exponent of refraction of the united surfaces ($R^6$) of the compound lens members ($C^1$ $C^2$).

2. An unsymmetrical object lens system, comprising, in combination, and enumerated with respect to the direction of the rays of light, a plano-convex lens (A), a biconcave lens (B) separated from said plano-convex lens by a dispersing air-space ($l^2$), and a compound lens ($C^1$ $C^2$) separated from said biconcave lens by an air-space ($l^4$ $l^5$) and comprising a concave lens ($C^1$) and a biconvex lens ($C^2$), in which lens system, firstly, the first two lenses (A and B) are so designed that they exert together a dispersing effect of such a strength that their collecting effect, if any, is practically zero; secondly, the reciprocal value of the focal distance of the second lens (B) is the opposite of that of the first lens (A) and its exponent of refraction—with reference to the yellow ray—is smaller than 1.56; thirdly, the compound lens members ($C^1$ $C^2$) have outer surfaces with different curvatures and the radius of curvature of their united surfaces ($R^5$ $R^7$) is longer than 80% of the effective opening diameter of the objective and these members are so designed as to have together a strongly collecting effect; fourthly, the sum of the absolute lengths of the radii of curvature of those surfaces ($R^1$ $R^3$) of the first two lenses (A and B) which are directed towards the object, together with the absolute length of that surface ($R^7$) of the compound lens ($C^1$ $C^2$) which is directed towards the image is greater than 80% of the total focal length of the objective; fifthly, the difference between the refraction numbers of the first lens (A) and of the last lens ($C^2$) is greater than 25% of the difference between the exponents of refraction of the united outer surfaces ($R^5$ $R^7$) of the compound lens ($C^1$ $C^2$); sixthly, the difference between the exponents of refraction of the second lens (B) and of the adjacent member ($C^1$) of the compound lens is smaller than the difference between the exponent of refraction of the united surfaces ($R^6$) of the compound lens members ($C^1$ $C^2$), and seventhly, the difference between the refraction numbers of the first two lenses (A and B) is smaller than 75% of the difference between the exponent of refraction of the united surfaces of the compound lens members ($C^1$ $C^2$).

3. An unsymmetrical object lens system, comprising, in combination, and enumerated with respect to the direction of the rays of light, a plano-convex lens (A), a biconvex lens (B) separated from said plano-convex lens by a dispersing air-space ($l^2$), and a compound lens ($C^1$ $C^2$) separated from said biconcave lens by an air-space ($l^4$ $l^5$) and comprising a concave lens ($C^1$) and a biconvex lens ($C^2$), in which lens system, firstly, the first two lenses (A and B) are so designed that they exert together a dispersing effect of such a strength that their collecting effect, if any, is practically zero; secondly, the reciprocal value of the focal distance of the second lens (B) is the opposite of that of the first lens (A) and its exponent of refraction—with reference to the yellow ray—is smaller than 1.56; thirdly, the compound lens members ($C^1$ $C^2$) have outer surfaces with different curvatures and the radius of curvature of their united surfaces ($R^5$ $R^7$) is longer than 80% of the effective opening diameter of the objective and these members are so designed as to have together a strongly collecting effect; fourthly, the sum of the absolute lengths of the radii of curvature of those surfaces ($R^1$ $R^3$) of the first two lenses (A and B) which are directed towards the object, together with the absolute length of that surface ($R^7$) of the compound lens ($C^1$ $C^2$) which is directed towards the image is greater than 80% of the total focal length of the objective; fifthly, the difference between the refraction numbers of the first lens (A) and of the last lens ($C^2$) is greater than 25% of the difference between the exponents of refraction of the united outer surfaces ($R^5$ $R^7$) of the compound lens ($C^1$ $C^2$); sixthly, the difference between the exponents of refraction of the second lens (B) and of the adjacent member ($C^1$) of the compound lens is smaller than the difference between the exponent of refraction of the united surfaces ($R^6$) of the compound lens members ($C^1$ $C^2$), seventhly, the difference between the exponents of the glasses of the compound lens members is smaller than the difference between the exponents at the united surfaces of these members; and eightly, the difference between the refraction numbers of the first two lenses (A and B) is smaller than 75% of the difference between the exponent of refraction of the united surfaces of the compound lens members ($C^1C^2$).

4. An unsymmetrical object lens system, comprising, in combination, and enumerated with respect to the direction of the rays of light, a plano-convex lens (A), a biconcave lens (B) separated from said plano-convex lens by a dispersing air-space ($1^2$), and a compound lens ($C^1C^2$) separated from said biconcave lens by an air-space ($1^41^5$) and comprising a concave lens ($C^1$) and a biconvex lens ($C^2$), in which lens system, firstly, the first two lenses (A and B) are so designed that they exert together a dispersing effect of such a strength that their collecting effect, if any, is practically zero; secondly, the reciprocal value of the focal distance of the second lens (B) is the opposite of that of the first lens (A) and its exponent of refraction—with reference to the yellow ray—is smaller than 1.56; thirdly, the compound lens members ($C^1C^2$) have outer surfaces with different curvatures and the radius of curvature of their united surfaces ($R^5R^7$) is longer than 80% of the effective opening diameter of the objective and these members are so designed as to have together a strongly collecting effect; fourthly, the sum of the absolute lengths of the radii of curvature of those surfaces ($R^1R^3$) of the first two lenses (A and B) which are directed towards the object, together with the absolute length of that surface ($R^7$) of the compound lens ($C^1C^2$) which is directed towards the image is greater than 80% of the total focal length of the objective; fifthly, the difference between the refraction numbers of the first lens (A) and of the last lens ($C^2$) is greater than 25% of the difference between the exponents of refraction of the united outer surfaces ($R^5R^7$) of the compound lens ($C^1C^2$); sixthly, the difference between the exponents of refraction of the second lens (B) and of the adjacent member ($C^1$) of the compound lens is smaller than the difference between the exponent of refraction of the united surfaces ($R^6$) of the compound lens members ($C^1C^2$), and seventhly, the ratio between the sum of all thicknesses of the glasses and the sum of the two air-gaps lying between the values 0.4 and 2.5.

5. An unsymmetrical object lens system, comprising, in combination, and enumerated with respect to the direction of the rays of light, a plano-convex lens (A), a biconcave lens (B) separated from said plano-convex lens by a dispersing air-space ($1^2$), and a compound lens ($C^1C^2$) separated from said biconcave lens by an air-space ($1^41^5$) and comprising a concave lens ($C^1$) and a biconvex lens ($C^2$), in which lens system, firstly, the first two lenses (A and B) are so designed that they exert together a dispersing effect of such a strength that their collecting effect, if any, is practically zero; secondly, the reciprocal value of the focal distance of the second lens (B) is the opposite of that of the first lens (A) and its exponent of refraction—with reference to the yellow ray—is smaller than 1.56; thirdly, the compound lens members ($C^1C^2$) have outer surfaces with different curvatures and the radius of curvature of their united surfaces ($R^5R^7$) is longer than 80% of the effective opening diameter of the objective and these members are so designed as to have together a strongly collecting effect; fourthly, the sum of the absolute lengths of the radii of curvature of those surfaces ($R^1R^3$) of the first two lenses (A and B) which are directed towards the object, together with the absolute length of that surface ($R^7$) of the compound lens ($C^1C^2$) which is directed towards the image is greater than 80% of the total focal length of the objective; fifthly, the difference between the refraction numbers of the first lens (A) and of the last lens ($C^2$) is greater than 25% of the difference between the exponents of refraction of the united outer surfaces ($R^5R^7$) of the compound lens ($C^1C^2$); sixthly, the difference between the exponents of refraction of the second lens (B) and of the adjacent member ($C^1$) of the compound lens is smaller than the difference between the exponent of refraction of the united surfaces ($R^6$) of the compound lens members ($C^1C^2$), and seventhly, the ratio between the sum of all thicknesses of the glasses and the sum of the two air-spaces, as well as the ratio between these air-gaps, lying between the values 0.4 and 2.5.

ALBRECHT WILHELM TRONNIER.